United States Patent [19]

Deitrick

[11] 3,737,072
[45] June 5, 1973

[54] FEEDING DEVICE FOR CYLINDRICAL TUBING

[75] Inventor: Rollin E. Deitrick, Winston-Salem, N.C.

[73] Assignee: Western Electric Company, Incorporated, New York, N.Y.

[22] Filed: Nov. 12, 1971

[21] Appl. No.: 198,271

[52] U.S. Cl. ............... 221/203, 221/266, 221/237, 221/205, 221/277
[51] Int. Cl. ............................................. B65h 3/60
[58] Field of Search .................. 221/266, 237, 277, 221/200, 203, 204, 205

[56] References Cited
UNITED STATES PATENTS

| | | | |
|---|---|---|---|
| 874,170 | 12/1907 | Davidson | 221/266 |
| 905,401 | 12/1908 | Billmeyer | 221/266 |
| 963,999 | 7/1910 | Davidson | 221/200 |

*Primary Examiner*—Samuel F. Coleman
*Assistant Examiner*—H. Grant Skaggs, Jr.
*Attorney*—W. M. Kain et al. and J. B. Hoofnagle, Jr.

[57] ABSTRACT

A device for periodically feeding workpieces such as tubing to a preselected location includes a cylindrical wheel having a plurality of circumferentially spaced teeth thereon. A cam overlies the wheel and engages the upper periphery of the teeth. As tubing is fed to the wheel from an overlying trough, the wheel is rotated so that the tubing is received in the exposed spaces between the teeth of the wheel. Simultaneously, the cam is reciprocated to agitate the overlying tubing into the exposed spaces between the teeth of the wheel.

2 Claims, 4 Drawing Figures

PATENTED JUN 5 1973 3,737,072

FEEDING DEVICE FOR CYLINDRICAL TUBING

BACKGROUND OF THE INVENTION

1. Field of the Invention

This invention relates in general to a feeding unit, and more particularly to a continuous feeding unit where workpieces are periodically fed thereto and dispensed therefrom for further transfer to an assembly unit.

2. Technical Considerations and Prior Art

In the manufacture of sealed contact switches, the various components making up a switch, (e.g., a glass sleeve and a pair of contacts) are conveyed by separate means to a fixture. The sealed contact switch is then assembled by indexing the fixture through various assembly stations at which assembly operations are performed.

When conveying the components to the above mentioned fixture during a continuous manufacturing operation, it is desired that each component reach the fixture at the same time so as to permit automatic and periodic assembly operations. Thus, a device used to convey a respective component must synchronously perform with the other conveying devices to periodically position each component simultaneously at the fixture. Moreover, to assure that a component is in proper position on the conveying device when the device is adjacent the fixture, each component must be dispensed at periodic intervals onto the conveying device.

The glass sleeve component is generally fed to the conveying device by a dispensing device which includes a wheel having a plurality of spaced teeth circumferentially therearound. The wheel is mounted for rotation about a suitable support and its periphery underlies an opening where glass tubing is fed to the wheel between the teeth as the wheel rotates. The glass tubing, which constitutes the glass sleeve, is dispensed into an underlying escapement which dispenses the tubing onto the conveying device.

Unfortunately, when feeding tubing to the wheel in batch amounts, such as by loading a chute overlying the opening with the tubing, there is a propensity for the tubing to accumulate and jam between the opening and the periphery of the wheel as the wheel rotates. Consequently tubing is not always fed uniformly between each of the teeth in the wheel. As a result, the tubing is not fed into the escapement at periodic intervals, and correspondingly, the glass tubing is not periodically dispensed onto the conveying device.

SUMMARY OF THE INVENTION

The present invention is drawn to a new and improved feeding device which overcomes the above mentioned drawback to feed tubing periodically to a conveying device.

A general object of the invention is to provide a feeding device which will uniformly collect and periodically dispense cylindrical tubing onto a conveyor device.

A more specific object of the invention is to provide a feeding device which will automatically and periodically dispense glass tubing onto a moving conveyor.

Briefly, in a general embodiment of the invention, the feeding device includes a cylindrical wheel mounted for axial rotation and having a plurality of spaced, slotted teeth extending over the circumference thereof. The device also includes a camming member which is juxtapositioned over the top circumference of the wheel and mounted to rotate back and forth in a circular motion over the top portion of the wheel. The reciprocating movement of the camming member prevents the tubing from jamming as it is fed into the rotating wheel and also prevents any unnecessary accumulative back-up of the tubing as it is batch fed into the wheel. A prong member having projections which complement the slots (hereinafter channels) on the teeth of the wheel is positioned so that the projections engage the channels at the lower periphery of the wheel adjacent to an opening to insure release of the glass tubing that is between the teeth.

BRIEF DESCRIPTION OF THE DRAWING

Other objects and advantages of the present invention will become apparent upon consideration of the following detailed description when read in conjunction with the accompanying drawing, in which.

DETAILED DESCRIPTION

1. Assembly

Figure 1:
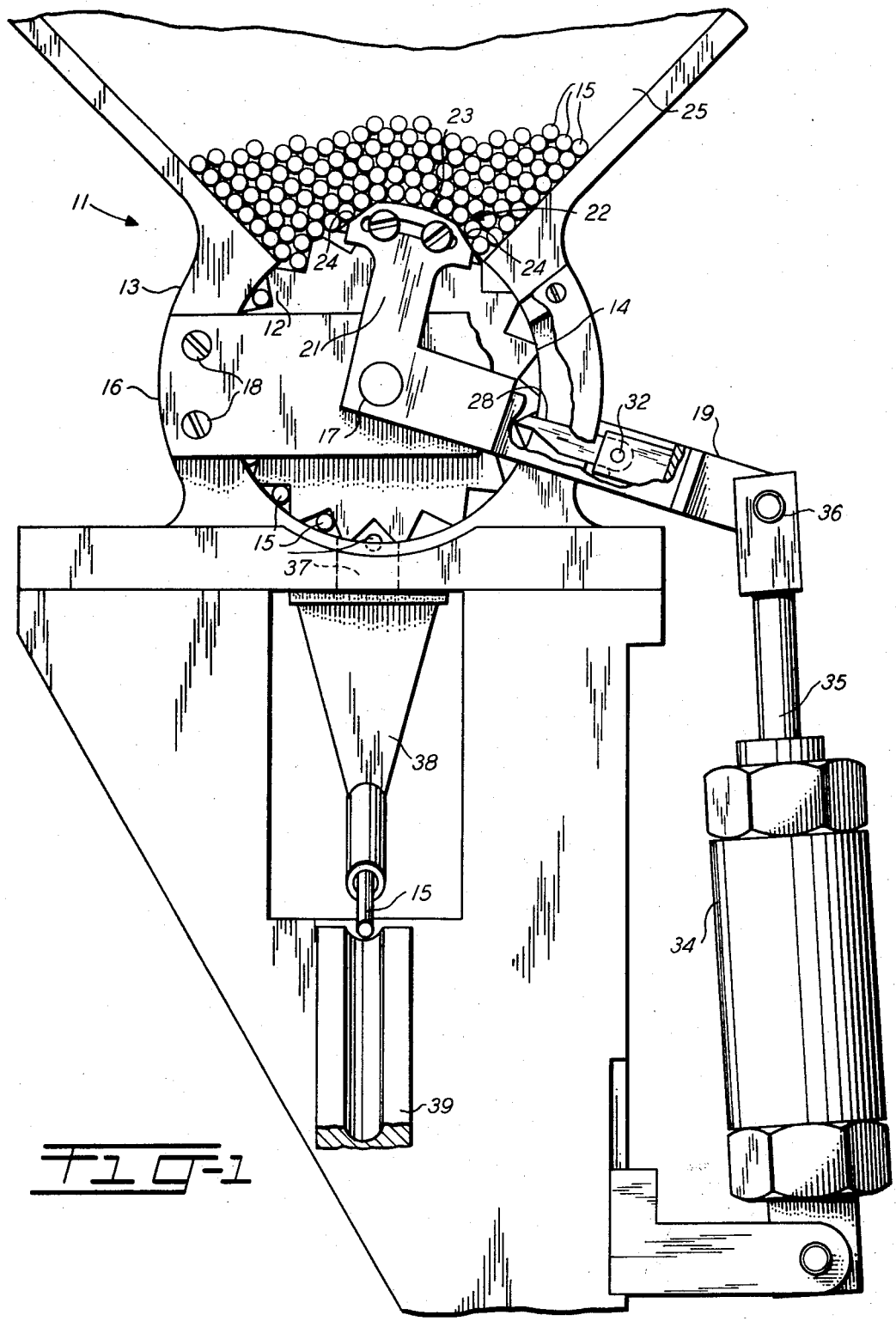
FIG. 1 is a side elevational view of the device encompassing the present invention illustrating the glass tubing feeding and dispensing operation.

Referring more particularly to FIG. 1, a feeding and dispensing device, designated generally by the numeral 11 includes a cylindrical wheel 12. The wheel 12 is mounted for axial rotation within an open top enclosure 13, and has a plurality of web-shaped teeth 14—14, extending over the circumference thereof. The teeth 14 are spaced a suitable distance apart to receive a desired workpiece such as a glass tubing 15. A fixture, such as a bracket 16, is mounted over the face of the wheel 12 by a suitable mounting, such as a screw 17, which extends through the bracket and centrally through the wheel. Additional mounted screws 18—18 secure the bracket 16 to the enclosure 13.

A handle 19 (FIG. 2) is pivotally mounted centrally through the wheel 12 (FIG. 1) via an L-shaped bracket 21 affixed to the handle and positioned over the bracket 16. The screw 17 extends through the bracket 21 to secure the bracket against the bracket 16. Accordingly, the bracket 21 is pivotally movable about the bracket 16.

A cam 22 is rigidly affixed to the top of the bracket 21 and extends over the top periphery of the wheel 12 for movement along an arc parallel to the periphery of the wheel. The cam 22 has a flat top surface 23 and bevelled edges 24—24 and overlies the teeth 14—14 situated at the top circumference of the wheel 12.

A trough-shaped member 25 extends upward from and defines the top of the enclosure 13. The trough 25 is defined by a pair of end walls 26—26 (FIG. 2) situated over the wheel 12, and serves as a chute for receiving the tubing 15. The end walls 26—26 are engagable with the cam 22 (FIG. 1) and confine the movement of the cam over the periphery of the wheel 12 when the bracket 21 is pivoted about the bracket 16.

Figure 2:
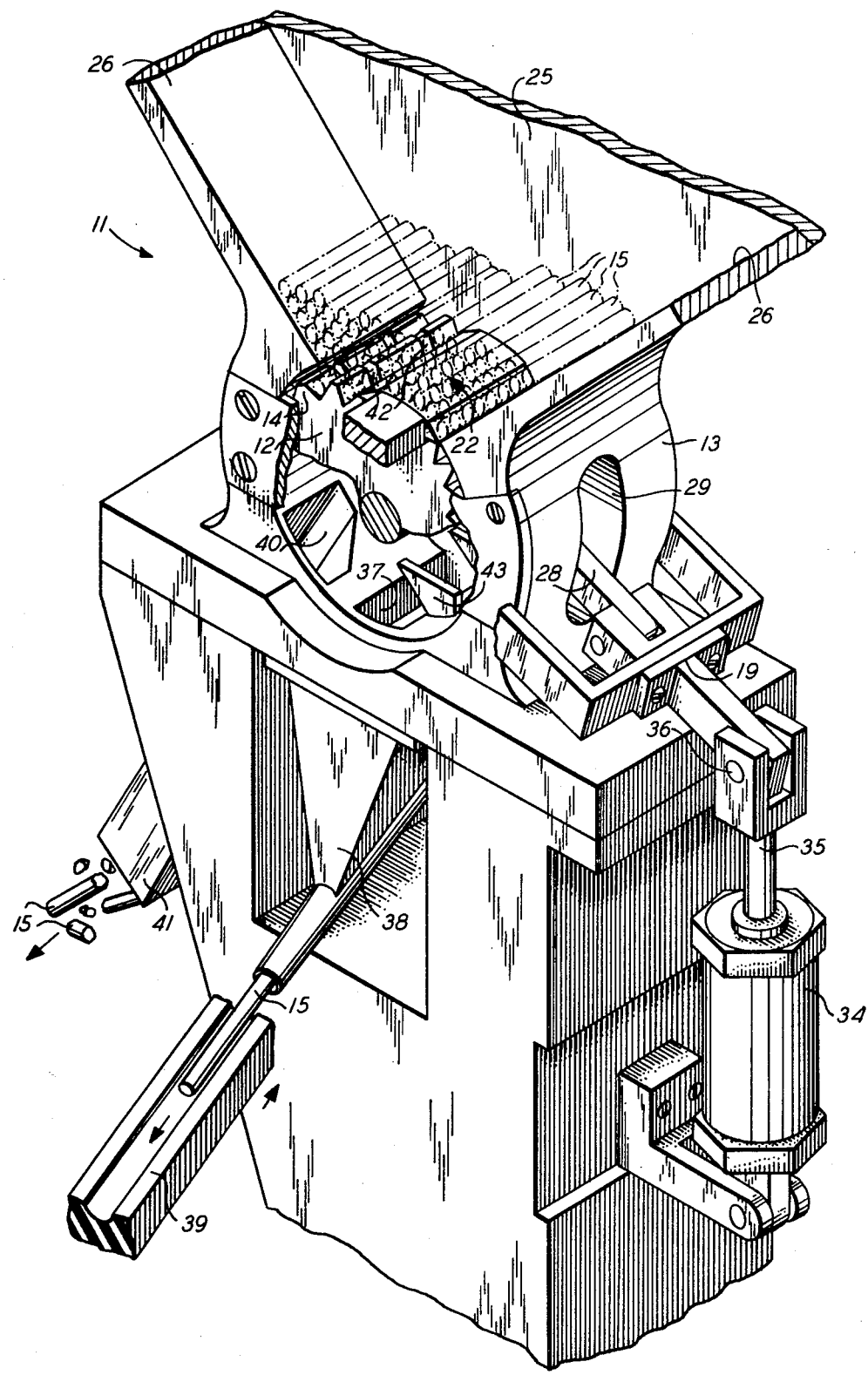
FIG. 2 is a perspective view of the device in FIG. 1, partially cut away, showing essential features of the device.
Figure 3:
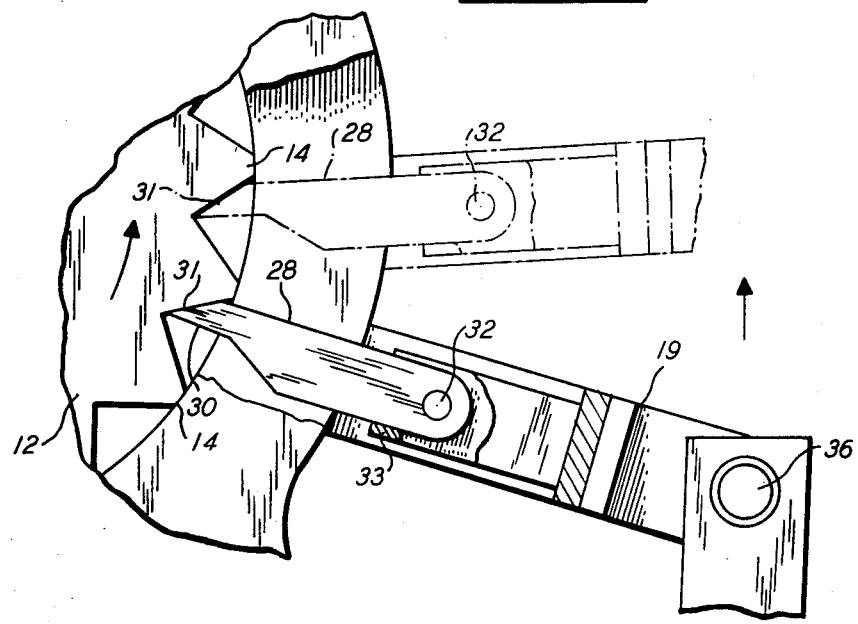
FIG. 3 is a side elevation view of a section of FIG. 1 illustrating in greater detail a part of the mechanism of FIG. 1.

A pawl 28 extends through an opening 29 (FIG. 2) in the enclosure 13 and engages the teeth 14 (FIG. 1) of the wheel 12. As best seen in FIG. 3, the head 30 of the pawl 28 has an angular top face 31 that engages the lower portion of the tooth 14 and complements the shape of the engaged portion of the tooth. The pawl 28 is pivotally mounted to the handle 19 by a pin 32. However, a stop 33 (FIG. 3) affixed to the handle 19 and mounted beneath the pawl 28 limits the movement of the pawl in a counterclockwise direction. Thus, when the handle 19 is rotated in a counterclockwise direction, the pawl 28 engages a tooth 14 on the wheel 12 to rotate the wheel in a counterclockwise direction as viewed in FIGS. 1, 2, and 3.

To actuate the handle 19 an air cylinder 34 (FIGS. 1 and 2) is mounted to the handle 19 via a piston rod 35 which extends upwardly therefrom. The piston 35 is connected to the handle 19 via a suitable mounting pin 36.

The enclosure 13 has a first lower central opening 37 situated directly beneath the wheel 12. The opening 37 is larger than the cross-sectional dimension of the tubing 15. Attached to the opening is a chute 38 which engages at its other end a continuously moving conveyor 39. The tubing 15 fed from the wheel 12 is dispensed through the opening 37, the chute 38 and onto the conveyor 39. The conveyor 39 moves in a direction as indicated by the arrow (FIG. 2) and is actuated by a suitable drive mechanism (not shown). A second opening 40 which is smaller in overall dimension than the dimension of the tubing extends through the lower part of the enclosure 13 to the left of the opening 37 and engages a second chute 41 which serves as an outlet for discarding broken tubing.

Figure 4:
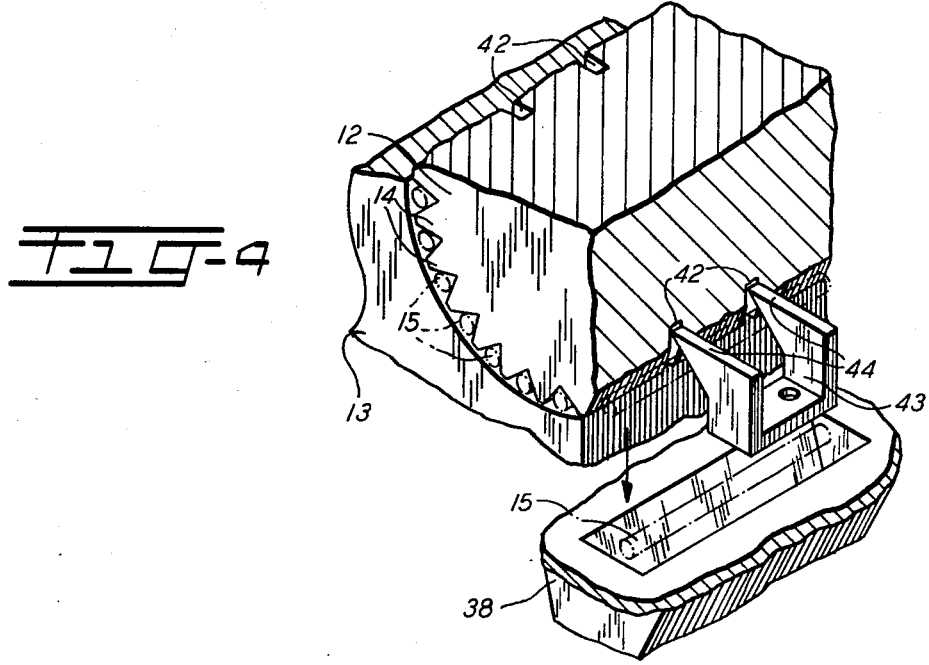
FIG. 4 is a perspective view of a section of FIG. 2 illustrating in greater detail another part of the mechanism.

Again referring to FIG. 2, it can be seen that each of the teeth 14 has two spaced channels 42—42. A prong 43 (also see FIG. 4) having a pair of projections 44—44 that are spaced the same distance as the channels 42—42, is affixed to the enclosure 13 adjacent the wheel 12 where the wheel engages the opening 37. The prong 43 is situated so that the projections 44—44 are aligned with the channels 42—42 on a given tooth 14 and are engageable therewith to force out any tubing that is jammed within the space between the teeth.

2. Operation

In the operation of the feeding device 11 (FIGS. 1 and 2) a plurality of the above described glass tubing 15—15 initially is bulk loaded into the trough 25 overlying the wheel 12 and cam 22. In this initial stage of operation, some of the openings between the teeth 14 are shielded by the enclosure 13 and the cam 22. The other openings are exposed to the tubing 15 and consequently, receive the tubing as it is loaded into the trough 25 and before operation of the device 11. The air cylinder 34 is next actuated by a conventional air control switch (not shown) to cause the air flow in the cylinder to travel in an upward direction and drive the piston 35 upwardly. The movement of the piston 35, in turn, moves the handle 19 upwardly. This movement forces the pawl 28 upwardly against the bottom surface of the engaging tooth 14 (FIG. 3) of the wheel 12 to advance the wheel in a counterclockwise direction. The raising of the handle 19 (FIG. 2) also actuates the pivotally mounted L-shaped bracket 21 (FIG. 1) and the corresponding affixed cam 22. When first actuated, the cam 22 moves from right to left over the wheel 12 (i.e, in the same direction as the movement of the wheel). In other words, when the handle 19 is displaced upwardly, the cam 22 and the wheel 12 move together in a counterclockwise direction as viewed in FIG. 1. As the cam moves, its upper surface 23 agitates the overlying glass tubing 15 to break up and prevent any log jamming of the tubing 15. Correspondingly, the bevelled edges 24 provide an incline to guide the agitated tubing 15 into the openings between the teeth 14 that are being exposed to the tubing as a result of the movement of the cam 23 and the rotation of the wheel 12.

At the completion of the upward stroke of the piston 35, the air flow in the cylinder 34 is reversed and the piston moves in a downward direction to move the cam 22 in a clockwise direction while the wheel 12 remains stationary. That is, the downward movement of the piston 35 reverses the movement of the cam 22 to a clockwise direction. This also reverses the movement of the pawl 28; however, since the pawl pivots in a clockwise direction, the pawl exerts no pressure on the wheel 12 as it moves downward. Consequently, the wheel 12 is momentarily in a stationary position during this part of the cycle and the pawl 18 pivots out of engagement with the aforementioned initially engaged tooth 14 and after clearing the tooth, the pawl falls by the weight of gravity against the stop 33 (FIG. 3) and into position to engage the lower surface of the next succeeding tooth. Meanwhile, the movement of the cam 22 continues to agitate the overlying tubing 15 to break up and prevent any log jam between the tubing that would hinder the flow of tubing into the exposed spaces between the teeth 14.

Continuous cycling of the piston 35 in the manner described above rotates the wheel 12 such that eventually the tubing 15 situated between the teeth will overlie the opening 37 of the enclosure 13 where the tubing gravity falls into the chute 38 (FIG. 1) via the opening 37. If the tubing 15 should somehow become wedged between the teeth 14, the projections 44—44 on the prong 43, which is in engagement with the channels 42—42, urges the tubing from between the teeth so that the tubing falls into the opening 37. The tubing 15 is dispensed periodically into the opening 37 due to the constant intermittent rotation of the wheel 12. Correspondingly, the tubing 15 is transmitted through the chute 38 and into the moving conveyor 39 also at periodic intervals. The conveyor 39 conveys the tubing to a desired station for assembly.

The reciprocal movement of the cam 22 provides agitation sufficient to assure that the tubing 15 is constantly moving and consequently is recieved between each of the teeth 14. As a result, the tubing 15 will be uniformly periodically dispensed to the moving conveyor 39. On occasion, there is bound to be some breakage of the tubing 15 during the feeding cycle. When this occurs, the broken tubing 15 falls freely through the opening 40 into the chute and is discarded. It is to be appreciated that unbroken tubing will not fall through the opening 40, since, as previously described, the opening is smaller than the tubing.

The wheel 12 may be made from many conventional materials, with the preferred materials being teflon, steel and aluminum. As seen in FIG. 2, the trough 25 is open at the front, so it is advantageous to incline the wheel 12 slightly, approximately 5° backward, to prevent the tubing 15 from sliding out of the wheel. It may be also advantageous to space the wheel 12 slightly from the face of the trough 25 so that any tubing which is inadvertently vertically oriented over the wheel during the feeding may fall between the wheel and the face of the trough when agitated. A suitable opening (not shown) in the housing 13 situated beneath the space between the wheel 12 and the trough 25 and away from the opening 37 may be provided to serve as an outlet for the tubing which falls between the wheel.

The control switch for the air cylinder 34 may consist of any conventional switch, such as a regular solenoid valve manufactured illustratively under Ser. No. 52D-123-12 by the Perfecting Service Co., Charlotte, North Carolina.

The above-described apparatus is an embodiment of the present invention and illustrates the principles of the invention. It should be noted that the apparatus is not necessarily limited to the fabrication of sealed contact switches, nor that of feeding only glass tubing. For example, tubing made from other materials may be fed and dispensed by the apparatus. Moreover, other modifications in the apparatus and its operating cycle can be made by persons having ordinary skill in the art without departing from the scope of the present invention.

What is claimed is:

1. A device for feeding cylindrical tubing to a preselected location at periodic intervals, comprising:

a wheel mounted for rotation and having a plurality of circumferentially spaced teeth thereon, the spacing between the teeth of a size to receive one tubing therein;

a cam mounted over a portion of the wheel, the lower surface of the cam engaging the upper periphery of the teeth on the wheel, the upper surface of the cam having a smooth beveled surface, the cam movable in an arc parallel to the periphery of the wheel;

an enclosure surrounding the wheel and cam, the enclosure having an open upper end to receive the tubing and a lower opening having overall dimensions larger than the dimensions of the tubing to discharge the tubing;

means for displacing the cam in a first and second direction along the arc parallel to the periphery of the wheel to agitate the overlying tubing to break up and prevent log jams and provide a continuous flow of the tubing into the spaces between the teeth as the spaces are exposed to the tubing so that a tube is positioned between each tooth of the wheel;

means for rotating the wheel in the first direction when the cam is displaced in the first direction; and means for receiving the tubing as it is dispensed from the lower opening as the wheel rotates to periodically feed the tubing to a preselected location.

2. A device for feeding cylindrical tubing to a preselected location at periodic intervals, comprising:

a wheel mounted for rotation in a first direction, said wheel having a plurality of circumferential teeth for carrying tubing therebetween;

a cam mounted for reciprocal movement in first and second directions along an arc parallel to the periphery of the wheel, the surface of the cam adjacent to the wheel covering a predetermined number of teeth on the wheel and the surface of the cam facing away from the wheel having beveled opposite ends;

means for feeding tubing to said wheel with said tubing overlying the cam and a section of the wheel, said section being sufficiently larger for tubing to be received between at least two teeth;

means for sequentially discharging tubing carried by the wheel;

means pivotally mounted for rotation in the first and second directions and connected to the cam for reciprocally rotating the cam in the first and second directions;

a pawl mounted to the cam rotating means for drivingly engaging the teeth of the wheel to rotate the wheel in the first direction simultaneously with like movement of the cam;

means for alternately rotating the cam rotating means in the first and second directions to rotate the wheel and the cam a predetermined distance in the first direction and to rotate the cam a predetermined distance in the second direction, the rotation of the cam in the first or the second direction agitating the overlying tubing to prevent jamming thereof and alternately exposing a section of the wheel at the opposite ends of the cam to guide the agitated tubing between the teeth; and means for receiving tubing discharged from the wheel as the wheel rotates in the first direction to feed the tubing to a preselected location.

* * * * *